United States Patent [19]

Itow

[11] Patent Number: 4,811,712
[45] Date of Patent: Mar. 14, 1989

[54] AIR INTAKE APPARATUS FOR USE IN DIESEL ENGINE

[75] Inventor: Koichiro Itow, Oyama, Japan

[73] Assignee: Kabushi Kaisha Komatsu Seisa Kusho, Tokyo, Japan

[21] Appl. No.: 2,216

[22] Filed: Jan. 12, 1987

[30] Foreign Application Priority Data

Jan. 17, 1986 [JP] Japan .................. 61-006552

[51] Int. Cl.⁴ .................. F02D 1/04; F02D 9/02
[52] U.S. Cl. .................. 123/399; 123/357; 123/400
[58] Field of Search ............... 123/399, 400, 403, 376, 123/357, 359, 378

[56] References Cited

U.S. PATENT DOCUMENTS

| 4,401,078 | 8/1983 | Kato et al. | 123/403 |
|---|---|---|---|
| 4,426,972 | 1/1984 | Kimura et al. | 123/378 |
| 4,463,721 | 8/1984 | Hayashi et al. | 123/378 |
| 4,471,611 | 9/1984 | Watanabe | 123/399 |
| 4,517,942 | 5/1985 | Prikey et al. | 123/376 |
| 4,519,361 | 5/1985 | Murakami | 123/399 |
| 4,622,936 | 11/1986 | Junginger | 123/399 |
| 4,624,228 | 11/1986 | Sahara et al. | 123/378 |

FOREIGN PATENT DOCUMENTS 517052 10/1955 Canada .................. 123/403

Primary Examiner—Tony M. Argenbright
Assistant Examiner—Eric R. Carlberg
Attorney, Agent, or Firm—Ronald P. Kananen

[57] ABSTRACT

An air intake apparatus for use in a spark-assisted diesel engine having a throttle valve mounted in an air intake connector connected with an air intake system of the engine, and a throttle valve actuating mechanism connected with a fuel regulating mechanism of the engine so that the throttle valve may be actuated or turned in the direction of throttling when the engine is operating at a partial load condition. The throttle valve actuating mechanism is connected through a mechanical device or the combination of the mechanical device and an electric device with the fuel regulating mechanism of the engine.

6 Claims, 7 Drawing Sheets

CONNECTED WITH ACCELERATOR

AIR INTAKE APPARATUS FOR USE IN DIESEL ENGINE

BACKGROUND OF THE INVENTION

1. Field of the Invention

This invention relates to an air intake apparatus for use in a diesel engine, and more particularly to an air intake apparatus for use in a spark-assisted diesel engine wherein ignition of the fuel injected into its cylinders is assisted by spark. In the spark assisted diesel engines of the kind specified above, a mixed fuel containing more than 10% by volume of methanol or ethanol is used as its fuel, and also an oxidation catalyst is disposed in its exhaust pipe.

2. Description of the Prior Art

In the previously produced air intake apparatus for use in the diesel engines of the kind specified, no adjustment has been made to reduce the amount of air intake when the engine is running under an idling condition or under a low load condition, that is, a partial load condition, or even if such an adjustment has been made, it has not always been satisfactory to meet the requirements.

Therefore, in the spark-assisted diesel engines provided with the previously produced air intake apparatus, perfect combustion of the fuel injected into cylinders thereof cannot be achieved under partial load condition, thus giving ill influence on the fuel consumption rate and the characteristics of exhaust gas.

SUMMARY OF THE INVENTION

The present invention has been contemplated and devised in view of the above-mentioned circumstances, and has for its object to provide an air intake apparatus for use in a spark-assisted diesel engine wherein perfect combustion of the fuel injected into cylinders can be achieved by adjusting the amount of air intake effectively even when the engine is running under low idling condition or low load condition, that is, partial load condition, thereby improving the fuel consumption rate thereof and reducing the amount of harmful or hazardous components in the exhaust gas.

Another object of the present invention is to provide an air intake apparatus for use in a spark-assisted diesel engine wherein alcohol is used as its fuel, and an oxidation catalyst is disposed in exhaust pipe thereof.

To achieve the above-mentioned objects, in accordance with a first aspect of the present invention, there is provided an air intake apparatus for use in a spark-assisted diesel engine comprising a throttle valve installed in an air intake connector connected with an air intake system of the engine, and a throttle valve actuator means connected with a fuel regulating mechanism of the engine so that the throttle valve may be actuated or turned in the direction of throttling when the engine is running under a partial load condition.

Further, in accordance with a second aspect of the present invention, there is provided an air intake apparatus for use in a spark-assisted diesel engine, characterized in that arrangement is made such that the negative pressure of throttled intake air is kept at a value in the range of 2,000 to 8,000 mmAq when the engine is running under a partial load condition.

Still further, in accordance with a third aspect of the present invention, there is provided an air intake apparatus for use in a spark-assisted diesel engine, characterized in that the throttle valve actuator means is connected through a mechanical device or the combination of the mechanical device and an electric device with the fuel regulating mechanism of the engine.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

Figure 1:
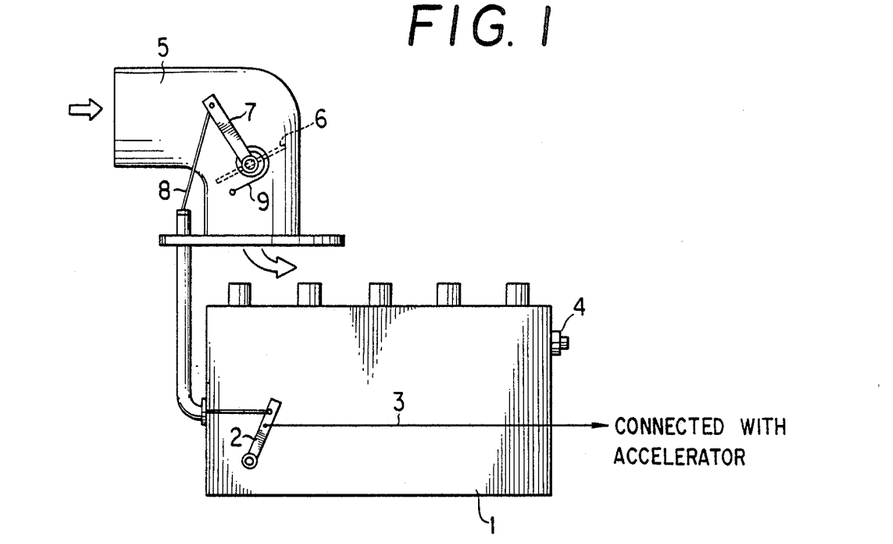
FIG. 1 is a schematic configurational explanatory view showing a first embodiment of air intake apparatus embodying the present invention.

Referring to FIG. 1, there is shown the construction of the first embodiment of air intake apparatus for use in a spark-assisted diesel engine embodying the present invention.

In FIG. 1, reference numeral 1 denotes a fuel injection pump for use in a spark assisted diesel engine, and 2 a fuel regulating lever. The fuel regulating lever 2 is connected through a connecting wire 3 with an accelerator mechanism not shown. The arrangement is made such that as the accelerator mechanism is manipulated by the operator the fuel regulating lever 2 is turned so as to adjust the amount of injection of a fuel. Reference numeral 4 denotes a rack limiter, and 5 an air intake connector connected with the air intake system of the spark-assisted diesel engine. A throttle valve 6 is mounted in the air intake connector 5. The throttle valve 6 has a throttle lever 7 fixedly secured thereto which is connected through a connecting wire 3 with the fuel regulating lever 2 of the fuel injection pump 1. The above-mentioned throttle valve 6 is biased by means of a spring 9 in the closing direction. When the fuel regulating lever 2 is turned in the direction of increasing the output of the engine, the throttle valve 6 is opened in response to the turning of the lever 2 against the biasing force of the spring 9.

Figure 2:
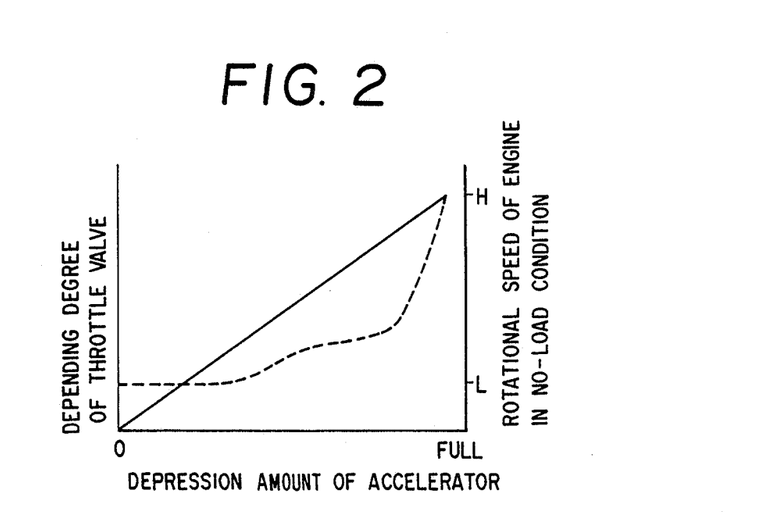
FIG. 2 is a graph showing the relationship between the amount of depression of an accelerator pedal and the degree of opening of the throttle valve in the first embodiment shown in FIG. 1.

In the above-mentioned arrangement, if the accelerator is manipulated in the direction of increasing the output of the engine, then the degree of opening of the throttle valve 6 is increased in proportion to the manipulated variable of the accelerator means as shown by a solid line in FIG. 2. The rotational speed of the engine in no load condition at that time will vary as shown by a dotted line in FIG. 2.

The negative pressure of the throttled intake air obtained by opening the above-mentioned throttle valve varies from a maximum value of about 8,000 mmAq to a minimum value of 0 mmAq.

Stated briefly, the negative pressure of the throttled intake air varies from about 8,000 mmAq under idling condition and a partial load condition to 0 mmAq under the maximum output condition.

Accordingly, under a partial load condition, the air fuel ratio is reduced so as to increase the flame speed thereby improving the combustion of fuel, the fuel consumption rate and the characteristics of the exhaust gas.

Further, the reduction in the air fuel ratio under a partial load condition will raise the temperature of the exhaust gas as well as that of the catalyst disposed in the exhaust pipe, thereby activating and cleaning the exhaust gas.

The fuel used in this engine is alcohol, and includes, more specifically, methanol ethanol, and a mixed fuel which contains more than 10% by volume of either of methanol or ethanol.

EXPERIMENTAL EXAMPLE

The engine was run under a low idling condition using a fuel which contains 100% by volume of methanol. By changing the degree of opening of the throttle valve, the negative pressure of the throttled intake air was varied from 0 to 8,000 mmAq so as to observe changes in the temperature of the catalyst, the density of hydrocarbon in the exhaust gas and the fuel consumption rate.

Figure 3:
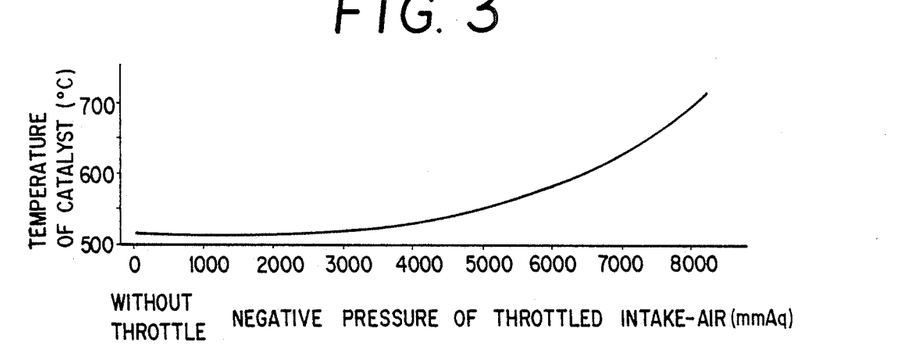
FIG. 3 is a graph showing the relationship between the negative pressure of the throttled intake air and the temperature of the catalyst in the first embodiment shown in FIG. 1.
Figure 4:
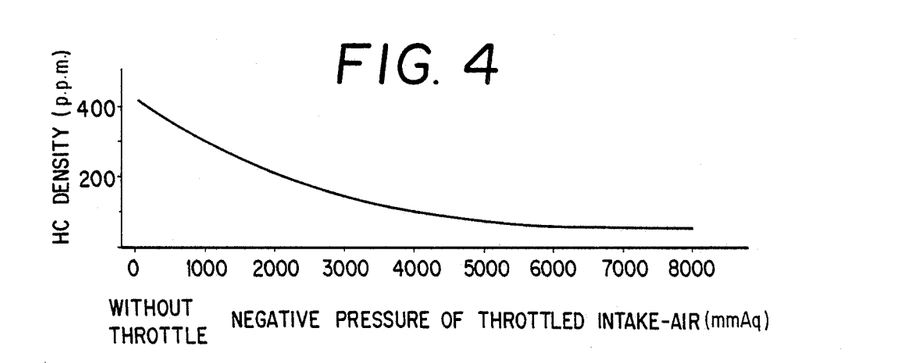
FIG. 4 is a graph showing the relationship between the negative pressure of the throttled intake air and the density of hydrocarbon in the exhaust gas in the first embodiment shown in FIG. 1.
Figure 5:
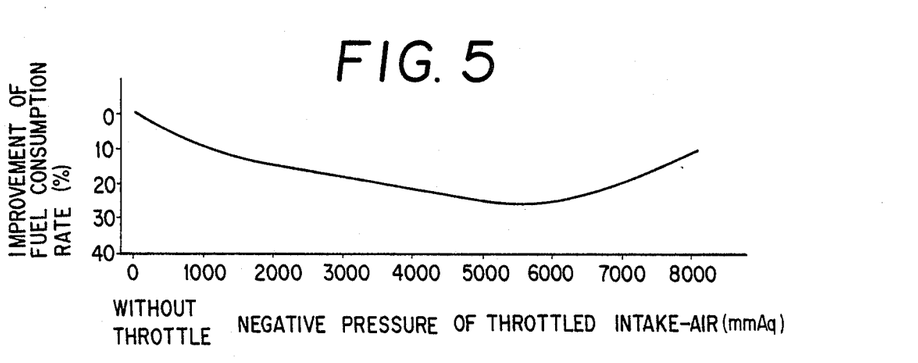
FIG. 5 is a graph showing the relationship between the negative pressure of the throttled intake air and improvement of the fuel consumption rate in the first embodiment shown in FIG. 1.

As a result, the temperature of the catalyst as shown in FIG. 3, the density of hydrocarbon in the exhaust gas as shown in FIG. 4, and the fuel consumption rate as shown in FIG. 5 were obtained. These experimental results revealed that improved hydrocarbon densities and fuel consumption rates were obtained at negative pressures of throttled intake air in the range of 2,000 to 8,000 mmAq.

Figure 6:
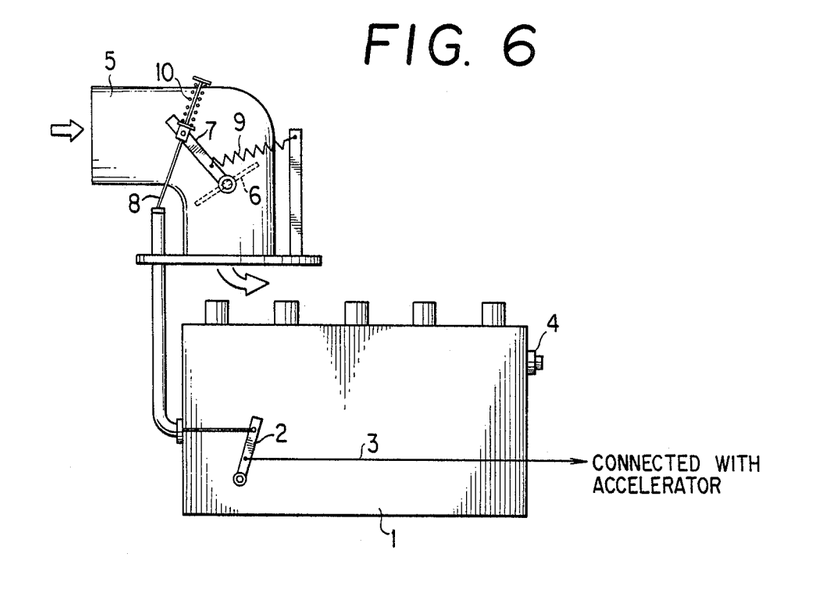
FIG. 6 is a schematic configurational explanatory view showing a second embodiment of air intake apparatus embodying the present invention.

FIG. 6 shows a second embodiment of air intake apparatus for use in a spark-assisted diesel engine embodying the present invention.

In this embodiment, a throttle lever 7 is connected through an auxiliary spring 10 with a wire 8.

Figure 7:
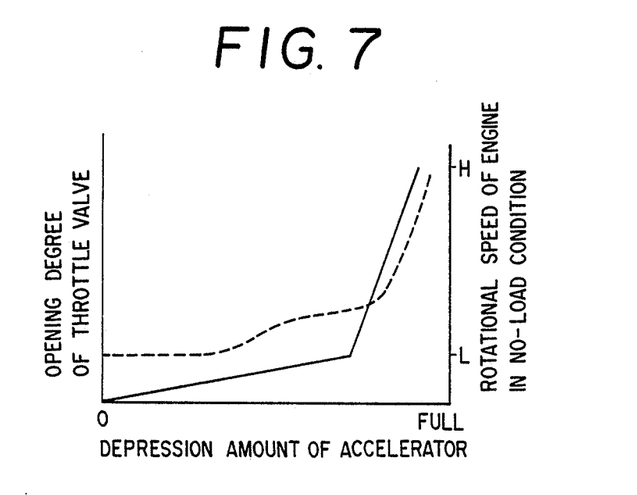
FIG. 7 is a graph showing the relationship between the amount of depression of the accelerator pedal and the degree of opening of the throttle valve in the second embodiment shown in FIG. 6.

The degree of opening of the throttle valve 6 obtained by manipulating the accelerator device in this embodiment will vary as shown by a solid line in FIG. 7. The degree of opening of the throttle valve 6 is small in the zone where the resilient force of the auxiliary spring 10 is made effective, and will increase from the state the auxiliary spring 10 has been flexed fully.

In this second embodiment, the throttling effect made by the accelerator device at the initial manipulation stage is rendered effective so that an improvement in the fuel consumption rate under a partial load condition can be achieved.

Figure 8:
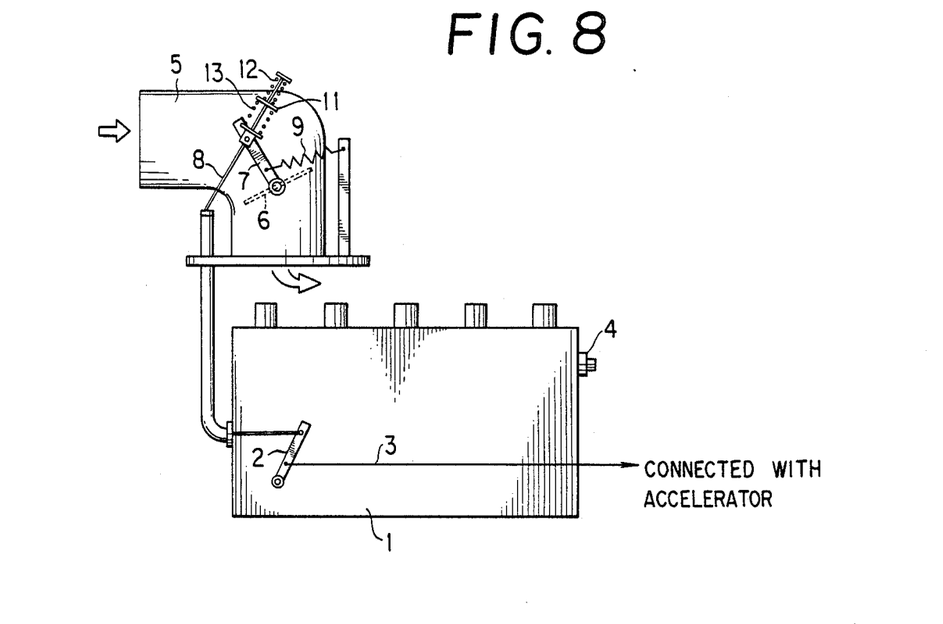
FIG. 8 is a schematic configurational explanatory view showing a third embodiment of air intake apparatus embodying the present invention.

FIG. 8 shows a third embodiment of air intake apparatus for use in a spark-assisted diesel engine embodying the present invention.

In this embodiment, a throttle lever 7 is connected with a wire 8 through two pieces of auxiliary springs 12 and 13 whose spring constants are different, the auxiliary springs having a spring seat 11 fitted inbetween.

Figure 9:
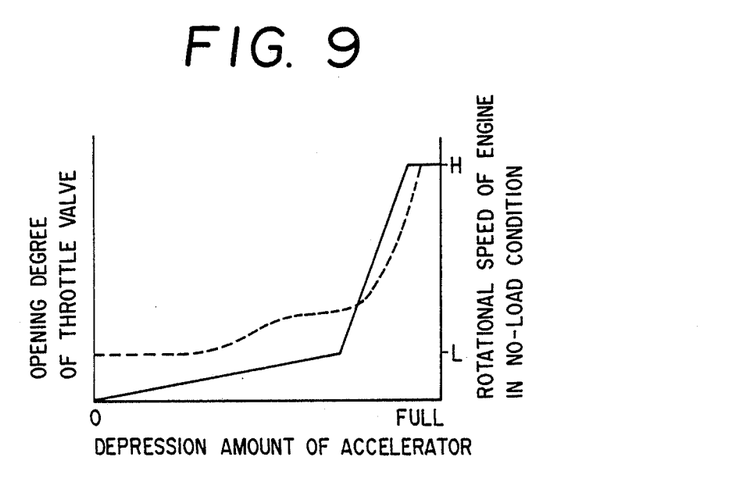
FIG. 9 is a graph showing the relationship between the amount of depression of the accelerator pedal and the degree of opening of the throttle valve in the third embodiment shown in FIG. 8.

The degree of opening of the throttle valve 6 obtained by manipulating the accelerator device in this embodiment will vary as shown by a solid line in FIG. 9. In the zone where the resilient force of the auxiliary spring 12 whose spring constant is lower is exerted, the degree of opening of the throttle valve 6 is small as in the case of the aforementioned second embodiment. The throttle valve 6 is adapted to be turned by the auxiliary spring 13 having a higher spring constant from the state where the auxiliary spring 12 has been flexed fully. In case where the flexing force of the auxiliary spring 13 having a higher spring constant overcomes the force of depressing the accelerator pedal, the throttle valve 6 will turn integrally with the wire 8 so as to increase the degree of opening thereof. After the throttle valve 6 has been opened fully and rendered unable to be turned further, when depression of the accelerator pedal is further enforced, the auxiliary spring 13 having a higher spring constant is then flexed, so that the accelerator pedal can be depressed further to its full extent under the condition where the throttle valve 6 has been opened fully.

In this third embodiment, the throttle valve 6 can be opened fully before the accelerator pedal is depressed fully under a high load condition. Therefore, the fuel consumption rate when the accelerator pedal is depressed fully, i.e., under a high load condition can be improved significantly.

In FIGS. 7 and 9, the rotating speed of the engine is shown by a dotted line.

Further, the accelerator device may be connected with the throttle valve 6 through a cam means instead of the spring so that the throttle valve 6 may be controlled by manipulating the accelerator device as shown in FIGS. 7 and 9.

Figure 10:
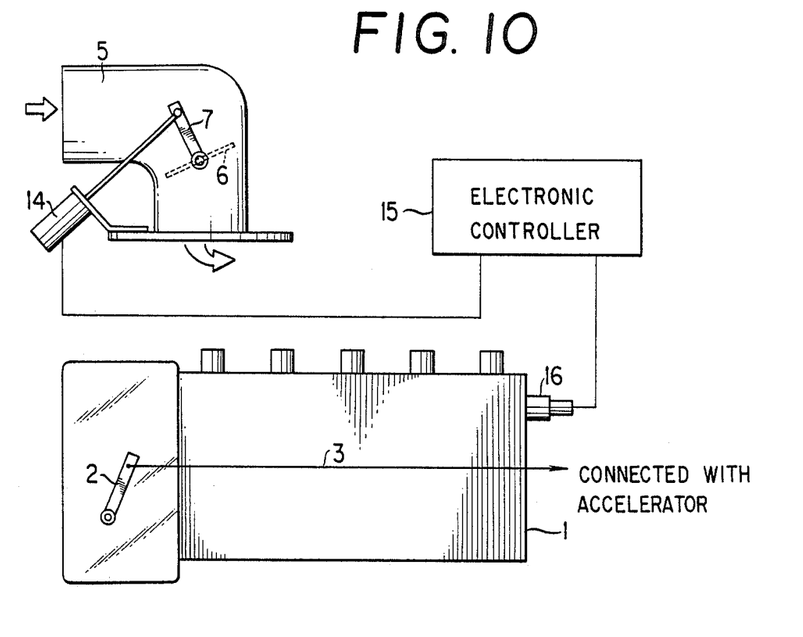
FIGS. 10 and 11 are schematic configurational explanatory views showing fourth and fifth embodiments of air intake apparatus embodying the present invention, respectively.

FIG. 10 shows a fourth embodiment of air intake apparatus for use in a spark-assisted diesel engine embodying the present invention.

In this embodiment, an actuator means 14 is connected to the throttle lever 7 connected to the throttle valve 6 so that the latter can be actuated by the actuator means 14. Reference numeral 15 denotes an electronic controller adapted to control the above-mentioned actuator means 14, and 16 a rack sensor adapted to detect the position of the rack of the fuel injection pump 1. The arrangement is made such that the position of the rack of the fuel injection pump 1 is electrically detected by means of the rack sensor 16, and the detection signal generated by the sensor 16 is utilized to electrically control the degree of opening of the throttle valve 6 through the electronic controller 15 and the actuator 14.

Figure 11:
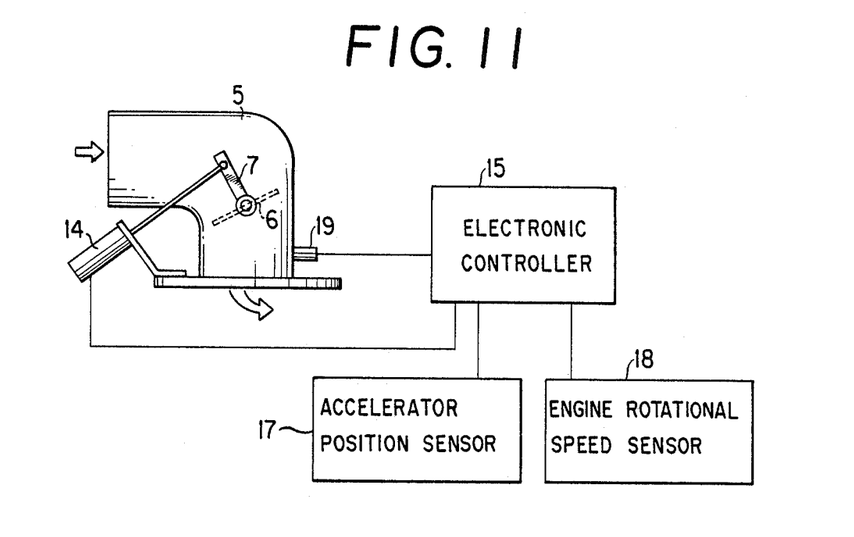

FIG. 11 shows a fifth embodiment of air intake apparatus for use in a spark assisted diesel engine embodying the present invention.

In this embodiment, an actuator means 14 is connected to a throttle lever 7 attached to the throttle valve 6 so that the latter may be actuated by means of the actuator means 14. Reference numeral 15 denotes an electronic controller adapted to electronically control the aforementioned actuator means 14, 17 an accelerator position sensor, and 18 an engine rotating speed sensor. The arrangement is made such that the electronic controller 15 transmits a control signal to the actuator means 14 in accordance with the position of the accelerator detected by the sensor 17 and the rotating speed of the engine detected by the sensor 18, and the actuator means 14 is rendered operative by the control signal so that the throttle valve 6 is controlled to increase the degree of opening thereof in accordance with the amount of depression of the accelerator pedal.

Reference numeral 19 denotes a sensor adapted to detect the negative pressure of the intake air. The value of the negative pressure detected by the sensor 19 is also fed into the electronic controller 15.

Further, in this embodiment, it is possible to detect any one of the output torque and the position of the rack of the fuel injection pump instead of detection of the position of the accelerator, and based on the result of detection, to generate a control signal by means of the electronic controller 15 to thereby control the degree of opening of the throttle valve 6.

Furthermore, in the fourth and fifth embodiments shown in FIGS. 10 and 11, respectively, the actuator means 14 may be of a mechanical or electrical type adapted to be controlled directly by the electronic controller 15 or a piston-cylinder unit adapted to be actuated by the fluid under pressure. In case of the piston-cylinder unit, the arrangement is made such that a fluid control valve is installed in the pressurized fluid supply circuit, and the fluid control valve is subjected to the control of the electronic controller 15.

Figure 12:
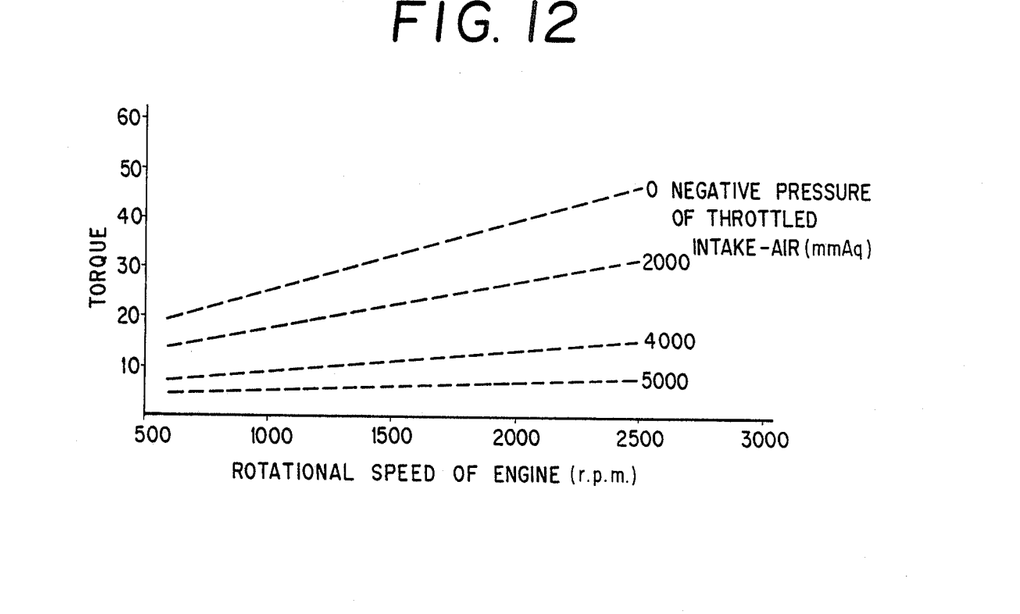
FIG. 12 is a graph showing negative pressures of intake air which enable the fuel consumption to be kept minimum.
Figure 13:
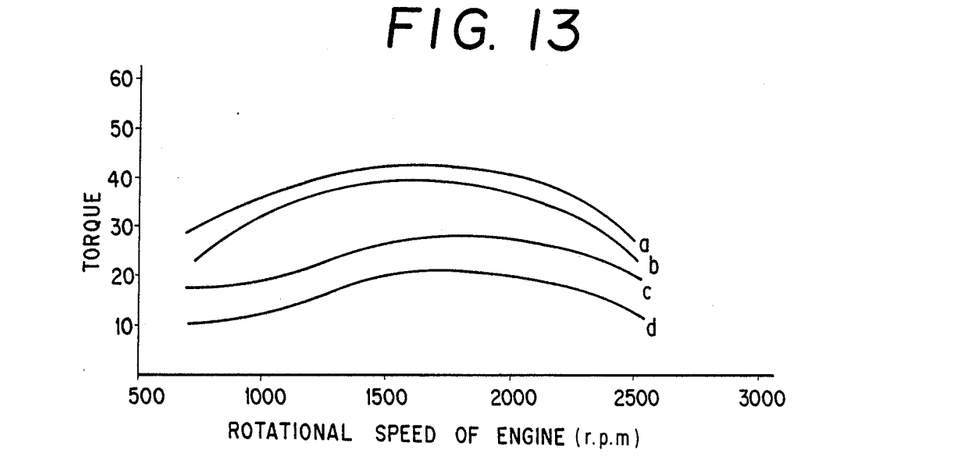
FIG. 13 is a graph showing the relationship between the engine output and the position of the rack.
Figure 14:
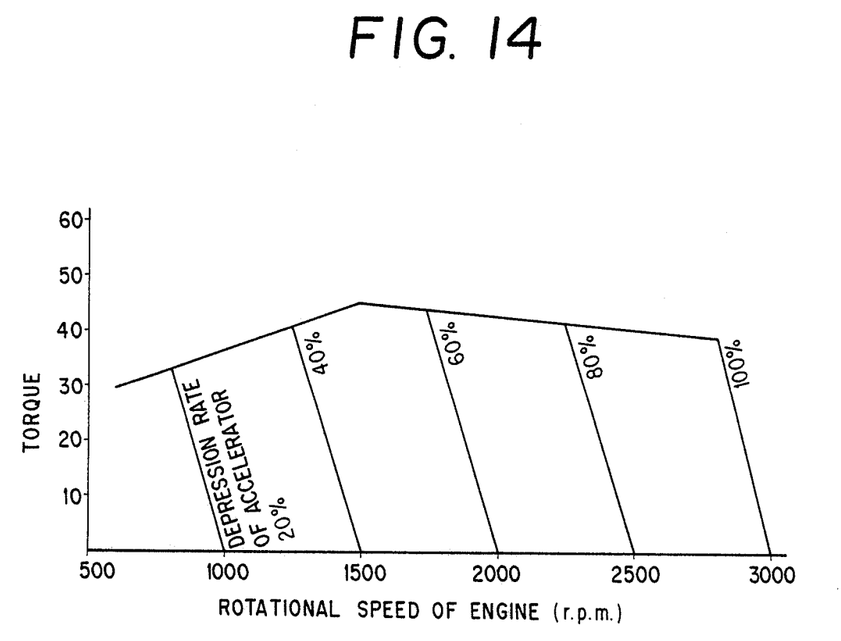
FIG. 14 is a graph showing the relationship between the engine output and the operation of the accelerator.

FIG. 12 is a diagram showing negative pressures of the throttled intake air required to keep the fuel consumption rate at a minimum value. FIG. 13 is a diagram showing the relationship between the engine output and the position of the rack. FIG. 14 is a diagram showing the relationship between the engine output and the manipulated variable of the accelerator, and hence the position of the rack of the fuel injection pump.

It is to be understood that the foregoing description is merely illustrative of the preferred embodiments of the present invention and that the scope of the invention is not to be limited thereto. Additional modifications or alterations of the invention will readily occur to those skilled in the art without departing from the spirit or scope of the invention.

What is claimed is:

1. An air intake apparatus for use in a spark-assisted diesel engine, comprising a throttle valve mounted in an air intake connector connected with an air intake system of the diesel engine, and a throttle valve actuator means connected with a fuel regulating mechanism of the engine so that the throttle valve may be actuated or turned in the direction of throttling when the engine is operating under a partial load condition, wherein said throttle valve actuator means comprises a throttle lever fixedly secured to said throttle valve, a length of wire connecting the throttle lever with said fuel regulating mechanism of the engine, and spring means for biasing said throttle valve toward a closed position, so that said throttle valve may be actuated or turned in the direction of throttling when the engine is operating under a partial load condition.

2. The air intake apparatus as set forth in claim 1, characterized in that the negative pressure of the throttled intake air is kept at a value in the range from 2,000 to 8,000 mmAq when the engine is operating under a partial load condition.

3. The air intake apparatus as set forth in claim 1, characterized in that said wire is connected through an auxiliary spring with said throttle lever.

4. The air intake apparatus as set forth in claim 1, characterized in that said wire is connected with said throttle lever through two auxiliary springs whose spring constants are different, said springs being separated from each other by a spring seat interposed between them.

5. An air intake apparatus for use in a spark-assisted diesel engine having an accelerator, comprising:
   a throttle valve mounted in an air intake connector connected with an air intake system of the diesel engine;
   a throttle valve actuator means connected with a fuel regulating mechanism of the engine so that the throttle valve may be actuated or turned in the direction of throttling when the engine is operating under a partial load condition;
   an accelerator position sensor;
   an engine rotating speed sensor; and
   an intake air negative pressure sensor;
   wherein said throttle valve actuator means comprises a throttle lever fixedly secured to said throttle valve, an actuator connected with the throttle lever, and an electronic controller, said accelerator position sensor, said engine rotating speed sensor and said intake air negative pressure sensor being connected to said electronic controller to send signals to said electronic controller, and said electronic controller being connected to said actuator to control the operation of said actuator.

6. An air intake apparatus for use in a spark-assisted diesel engine having a fuel regulating mechanism, comprising:
   a throttle valve mounted in an air intake connector connected with an air intake system of the diesel engine; and
   means for moving the throttle valve in a direction increasing throttling of the air flow to the engine as a continuous function of a decreasing load to the engine, said moving means comprising a mechanical linkage connecting the fuel regulating mechanism to said throttle valve, which includes a throttle lever fixed to said throttle valve, a length of wire connecting the throttle lever with the fuel regulating mechanism, and spring means connected between said air intake connector and one of said throttle valve and said throttle lever.

* * * * *

UNITED STATES PATENT AND TRADEMARK OFFICE
CERTIFICATE OF CORRECTION

PATENT NO. : 4,811,712
DATED : March 14, 1989
INVENTOR(S) : Koichiro Itow

It is certified that error appears in the above-identified patent and that said Letters Patent is hereby corrected as shown below:

On the face of the patent, the name of the assignee should read as follows:

-- KABUSHIKI KAISHA KOMATSU SEISAKUSHO --

Signed and Sealed this

Tenth Day of October, 1989

Attest:

DONALD J. QUIGG

Attesting Officer

Commissioner of Patents and Trademarks